United States Patent [19]

Werres et al.

[11] Patent Number: 5,295,264

[45] Date of Patent: Mar. 15, 1994

[54] MODULARLY STRUCTURED INTEGRATED SERVICES DIGITAL NETWORK (ISDN) COMMUNICATION SYSTEM

[75] Inventors: Bernhard Werres, Graefelfing; Dietmar Weber, Munich, both of Fed. Rep. of Germany

[73] Assignee: Siemens Aktiengesellschaft, Munich, Fed. Rep. of Germany

[21] Appl. No.: 835,194

[22] Filed: Feb. 13, 1992

[30] Foreign Application Priority Data

Feb. 13, 1991 [DE] Fed. Rep. of Germany ....... 4104365

[51] Int. Cl.$^5$ ............................................... G06F 9/46
[52] U.S. Cl. .................................... 395/650; 395/700; 364/280; 364/284.4; 364/230.1; 364/230; 364/231.4; 364/232.7; 364/242.4
[58] Field of Search ................. 395/650, 700; 370/58.2

[56] References Cited

U.S. PATENT DOCUMENTS 4,903,258 2/1990 Kuhlmann et al. ............... 370/58.2
4,993,017 2/1991 Bachinger et al. ............... 370/58.2

Primary Examiner—Kevin A. Kriess
Assistant Examiner—Matthew M. Payne
Attorney, Agent, or Firm—Hill, Steadman & Simpson

[57] ABSTRACT

A modularly-structured integrated services digital network (ISDN) communication system comprises a system processor that should be available for a real-time operating system and for a timesharing operating system. In order to enable continuous transitions of the system processor from one operating system into the other operating system, the task having the lowest priority (idle task) and a program subsystem having comparatively high priority in the real-time operating system (multitasking operating system) are fashioned as branch subsystems in which an assignment change from the addressing tables of the real-time operating system onto that of the timesharing operating system occur. The program subsystem with comparatively high priority which is fashioned as a branch subsystem assures that a certain minimum portion of the calculating capacity of the system processor is assigned to the timesharing operating system independently of the traffic load of the real-time operating system.

6 Claims, 10 Drawing Sheets

MODULARLY STRUCTURED INTEGRATED SERVICES DIGITAL NETWORK (ISDN) COMMUNICATION SYSTEM

BACKGROUND OF THE INVENTION

Field of the Invention

The present invention is directed to a modularly-constructed integrated services digital network (ISDN) communication system of the type having at least one switching unit comprising a switching network and to which apparatus networks can be connected via peripheral modules. The communication system has a memory-programmed system processor and comprises a real-time operating system for controlling program subsystem for controlling program subsystems provided for the execution of communication technology-associated functions and for the control of an idle task program subsystem that is fashioned as a branch subsystem for a transition to a subscriber operating system. It also has a system memory that comprises memory segments addressable via descriptors which has a system table memory that contains system table descriptors referring to memory segments of the real-time operating system and has a further system table memory that contains real-time interrupt descriptors for events pertaining to the real-time operating system and a module table memory that can be selected alternatively to the system table memory and that contains module table descriptors referring to memory segments of the subscriber operating system. The module table memory also contains communication descriptors referring to intercommunication segments of the real-time operating system; these communication descriptors can be interpreted identically with the system table descriptors contained in the system table memory and referring to the intercommunication segments and among which at least one code segment descriptor for access onto the code segment of the first branch subsystem, one status segment descriptor for access onto the status segment assigned in the real-time operating system to the branch subsystem, and one data segment descriptor for access onto an intercommunication data segment are located, this intermediately storing the input information required by each of the two operating systems given a transition to the respective other operating system.

The system has a further module table memory that can selected alternatively to the other system table memory and that contains TS interrupt descriptors for events pertaining to the subscriber operating system, and having control statements in the first branch subsystem that, given activation of the branch subsystem, trigger an assignment change of the system processor from the system table memory to the module table memory and, upon call-in of a status segment descriptor, subsequently effects a process change into the interrupt transition routine that is subsequently ended, control statements in the interrupt transition routine that, given activation of the interrupt transition routine and upon call-in of the communication status segment descriptor, initiates a process change into the first branch subsystem, further control statements in the branch subsystem that effect an allocation change of the system processor from the module table memories to the system table memories. The invention is particularly characterized in that a program subsystem having comparatively high priority is fashioned in the real-time operating system as a further or second branch subsystem, in that the second branch subsystem, given the respective arrival of a first periodic event, assumes a ready state in order to be assigned to the system processor in the real-time operating system for execution, that the further module table memory contains at least one interrupt descriptor for a second periodic event following the first periodic event, said at least one interrupt descriptor referring to the interrupt transition routine, that the further module table memory contains interrupt descriptors for events pertaining to the real-time operating system, said interrupt descriptors referring to an interrupt rescue routine in the subscriber operating system, and in that, following the assignment change of the system processor from the module table memories to the system table memories, the second branch subsystem assumes a dormant condition provided in the real-time operating system as a non-ready task condition.

The European patent application 0 333 123 basically discloses such a communication system that controls the communication system-associated operations and tasks with the assistance of a real-time operating system and additionally comprises a subscriber operating system that is coupled to the real-time operating system such that, first of all, the data and data applications administered by the real-time operating system can be prioritized over the access of the subscriber operating system and, secondly, the data applications conducted under the subscriber operating system can be inserted into the communication system without additional adaptation expense. Due to the implementation of a subscriber operating system, for example of the operating system XENIX, the communication system has therefore been lent a double function; it continues to handle the communication-oriented jobs and is additionally available for individual program development and data processing in the sense of a general data processing (DP) system.

A common processor device is provided in the known communication system for both operating systems, communication-oriented jobs to be handled in this common processor device under the administration of the real-time operating system and this common processor device being made available to the subscriber operating system in those times in which no functions related to communication technology are to be satisfied.

In order to enable a continuous transition between the two operating systems, certain descriptors constructed in accordance with the addressing mechanism of the system processor are identically fashioned for both operating systems. The actual program-oriented transition from the real-time operating system into the subscriber operating system occurs in a modified program subsystem of the real-time operating system. In order to assure that time-critical or real-time functions of the real-time operating system are handled with priority over all functions of the subscriber operating system, the idle task program subsystem of the real-time operating system in the known communication system is fashioned, so to speak, as a branch for a transition into the subscriber operating system. What this means is that a transition can occur only when the real-time operating system has activated its idle task program subsystem, i.e. when no jobs are pending.

The transition from the subscriber operating system back into the real-time operating system is then initiated by an event (interrupt) that is directed to the real-time operating system. In order to be able to transfer data from one operating system into the other, an intercommunication data segment is provided that exercises a "mailbox function". For example, events directed to the subscriber operating system must be intermediately stored in the intercommunication data segment while the real-time operating system is being worked off in order to then be capable of being processed by the subscriber operating system after a transfer thereinto.

In the known communication system, the processing capacity of the system processor being assigned to the subscriber operating system is essentially dependent upon how high the load on the communication system is as a result of communications technology-associated jobs. Therefore, no calculations can be made, nor can any particulars be provided regarding the time interval which processing of a respective program in the subscriber operating system will occupy.

SUMMARY OF THE INVENTION

The object of the present invention, therefore, is to be able to assure at least a prescribable portion of the processing capacity of the system processor for the subscriber operating system with optimally-small program-oriented expense.

Proceeding from a communication system conforming to the features set forth above, this object is achieved, according to the present invention, by such a system that is characterized in that a program subsystem having comparatively high priority is fashioned in the real-time operating system as a further branch subsystem, in that the further branch subsystem, given the respective arrival of a first periodic event, assumes a ready state in order to be assigned to the system processor in the real-time operating system for execution, in that the further module table memory contains at least one interrupt descriptor for a second periodic event following the first periodic event, via at least one interrupt descriptor referring to the interrupt transition routine, in that the further module table memory contains interrupt descriptors for events pertaining to the real-time operating system, the interrupt descriptors referring to an interrupt rescue routine in the subscriber operating system, and in that, following the assignment change of the system processor from the module table memories to the system table memories, the further branch subsystem assumes a dormant condition provided in the real-time operating system as a non-ready task condition.

What is achieved, on the one hand, with the implementation of a second branch subsystem that is activated by a periodic event and whose priority is relatively high in comparison to the other program subsystems of the real-time operating system, is that a prescribable, minimum portion of the processing capacity of the system processor device is assigned to the other subscriber operating system even when communication-oriented functions are waiting for execution in the real-time operating system, and secondly, the distribution of the processing capacity still remains so flexible, however, that the processing of extremely-important program subsystems that are therefore classified higher in terms of priority is not delayed in the real-time operating system.

The modularly-structured ISDN communication system of the present invention is further characterized in that the interrupt rescue routine in the subscriber operating system stores the events pertaining the real-time operating system in the intercommunication data segment.

According to another feature of the invention, the modularly-structured ISDN communication system set forth above is particularly characterized in that the events stored by the interrupt rescue routine of the subscriber operating system in the intercommunication data segment are identified in the second branch subsystem.

According to another feature of the invention, the modularly-structured ISDN communication system set forth above is further particularly characterized in that the interrupt transition routine is available to both branch subsystems.

The modularly-structured ISDN communication system of the present invention, as set forth above, is further particularly characterized in that the first periodic event repeats with a period duration that is a multiple of the chronological spacing between the first and second periodic events.

According to another feature of the invention, the modularly-structured ISDN communication system, as set forth above is further particularly characterized in that the first periodic event and the second periodic event are generated for respective ones of two signal edges of a periodic signal pulse.

An exemplary embodiment of the invention shall be set forth below, whereby the description is essentially limited to those features that are added or, respectively, changed in comparison to the aforementioned prior art. European patent application 0 333 123 is expressly referenced for a comprehensive description, particularly for the structure of the communication system.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
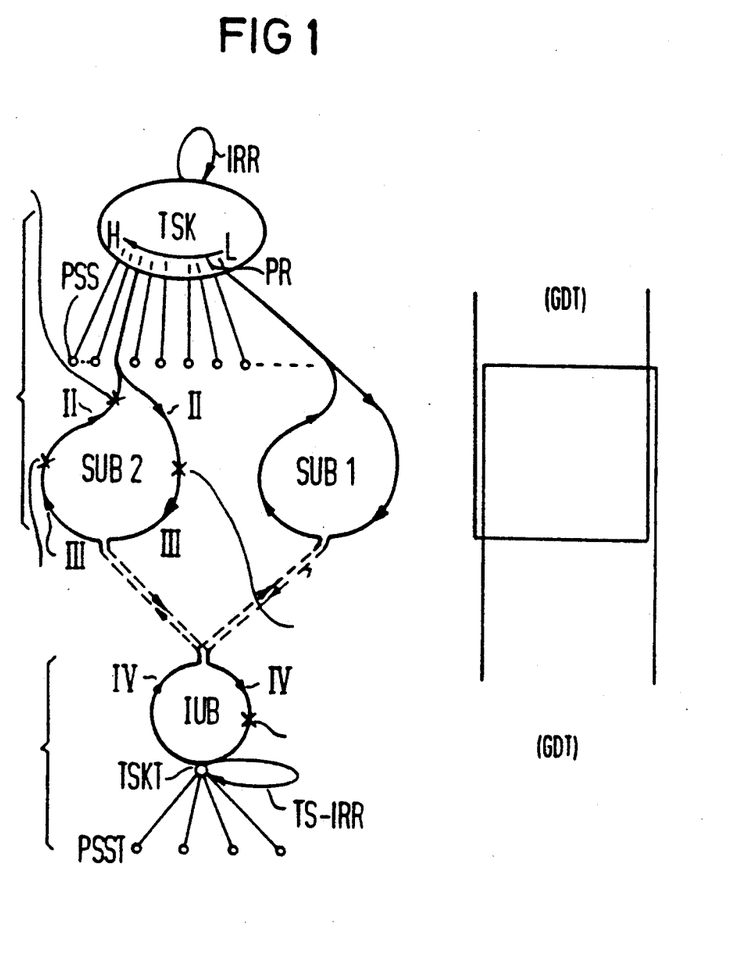
FIG. 1 is a basic operational system diagram for illustrating the transition from one operating system to the other operating system with the critical transition stages and markings II–IV assigned thereto.

FIG. 1 illustrates a basic fundamental diagram that is intended to show the transition from the one operating system to the other and that serves as an orientation aid for the program-oriented steps that are relevant in a transition between the two operating systems.

The upper portion of the drawing shows the structure of a real-time operating system with a task scheduler TSK and a plurality of program subsystems PSS bound thereto in a highly-schematic fashion. The task scheduler TSK is that portion of a multitask operating system that selects that program subsystem from the executable program subsystems having the highest priority PR and assigns it to a central processor for execution. That program subsystem having the lowest priority PR is referred to as an idle task and is fashioned as a branch subsystem SUB1. This branch subsystem SUB1 is symbolically shown as a loop on the drawing. In addition to the idle task fashioned as a branch subsystem SUB1, one of the program subsystems PSS having a comparatively high priority PR is also fashioned as a further branch subsystem SUB2. This further branch subsystem SUB2 is also symbolically shown as a loop on the drawing.

The lower portion of the drawing, again in high schematic fashion, shows the structure of the subscriber operating system with a task scheduler TSKT and program subsystems PSST bound thereto. An interrupt transition routine IUB of the subscriber operating system serving the purpose of coupling to the branch subsystem SUB1 or to the branch subsystem SUB2 is likewise shown in the form of a loop.

A transition from one operating system to the other operating system can occur either via the idle task fashioned to form the branch subsystem SUB1 or via the further branch subsystem SUB2. Both branch subsystems SUB1, SUB2 provide an immediate transition into the interrupt transition routine IUB of the subscriber operating system. The most important steps in a transition from one operating system to the other are marked by the numerals II–IV, whereby the exemplary embodiment only makes reference to that case in which the further branch subsystem SUB2 participates in the transition between the operating systems. For the illustrations of the descriptors in a system table memory and module table memory that are respectively relevant in the individual steps of the transition, these are shown excerpted at the right-hand edge of the drawing, together with the descriptors that are thereby critical.

A general explanation of the addressing method employed (as inserted into the drawing description) appears to be necessary for a better understanding of the operation, as well as of the cooperation of the system and module table memories with their descriptors.

A multistage and table-oriented addressing method is realized in a system processor (not shown), for example a microprocessor of the type 80386, for the formation of physical addresses. The fundamental principle of this method is in addressing functionally-interrelated memory blocks, referred to below as segments, in the memory locations of the main memory via descriptors and in promoting unambiguous assignment of these segments to individual program packets such as, for example, tasks, program subsystems, in terms of hardware.

A table that is referred to as a global descriptor table GDT is established in the main memory of the microprocessor for the addressing of the segments. The table GDT has a plurality of what are referred to as descriptors. The descriptors essentially represent an absolute address and link value with which the starting address and the length of a memory block in the memory locations of the microprocessor are unambiguously defined. A respective location number is unambiguously assigned to each of the descriptors within the table GDT. Descriptors are differently titled dependent upon employment. Therefore, data segment descriptors are provided that define memory blocks in which only data reside or code segment descriptors are provided for memory blocks in which only program code is stored.

However, there are also what are referred to as system segment descriptors that define starting address and length of memory blocks that are, in turn, constructed as a table, similar to the table GDT.

Among the system segment descriptors, a distinction is also made between local descriptor table descriptors LDTD and task or status segment descriptors TSSD. A local descriptor table descriptor LDTD defines a memory block that is referred to as a local descriptor table LDT. A local descriptor table LDT, in turn, contains the descriptors that correspond in structure to those of the table GDT; however, no system segment descriptors are possible in a local descriptor table LDT.

A status segment descriptor TSSD defines what is referred to as task or status segment TSS that is likewise constructed as a table, but is mainly reserved for storing internal microprocessor register contents. A marker, also referred to as an LDT selector, is also present in each status segment TSS, one of the LTDs being defined by the table GDT and being assigned to the appertaining status segment TSS via the LTD marker. The LTD marker represents that location number that the local descriptor table descriptor has in the table GDT that defines the assigned local descriptor table.

The microprocessor itself makes a plurality of hardware registers internally available that, given prescription of a relative address, enable a dynamic assignment of the relative address to a segment, so that an absolute address can be formed by way of which a memory location in the addressing range of the microprocessor is then selected.

One of a plurality of what are referred to as segment registers is selected according to a given rule for each instruction that the microprocessor encounters for execution. Either a location number of a table GDT or a location number of a table LDT resides in the segment registers.

Since, from the viewpoint of the microprocessor, only one table GDT is present whose absolute starting address and length can be set in what is referred to as a global descriptor table register GDTR internally within the microprocessor, a pertaining descriptor in the table GDT is immediately selected with a location number in the table GDT. Since no location numbers are assigned for system segment descriptors, the descriptor selected via the location number, as a segment descriptor, indicates the starting address and link of that segment in which a relative address potentially connected to the underlying instruction is to be addressed.

When a location number of a descriptor table LDT is recited in a selected segment register, a determination must first be made concerning the descriptor table LDT in which the location number should select a segment descriptor.

A distribution of the common jobs of the underlying operating system to various software packets, what are referred to as tasks or, respectively, program subsystems, whereof only one is running at any given time, can be assisted by the microprocessor in such a way that each task has its own task status segment TSS assigned thereto in which tasks-associated information and a reference to data and code segments belonging to the appertaining task are deposited.

Since it has always only the status segment TSS belonging to the momentarily-running task that is required and the status segments TSS belonging to the respective other task are of no significance, what is referred to as a task register TS is provided in terms of hardware in the microprocessor, the location number in the table GDT which that status segment descriptor TSSD that belongs to the momentarily-running task belongs residing in this task register TS.

With the selection of a task status segment TSS as a current status segment, a current descriptor table LDT is selected with the LDT selector deposited in the appertaining task status segment. The descriptor table LDT selector represents that location number in the global descriptor table GDT that belongs to the local descriptor table descriptor LDTD that defines the current local descriptor table LDT.

Upon selection of a current status segment, the current local descriptor table LDT is identified by the microprocessor via an internal local descriptor table register LDTR in which the local descriptor table LDT selector taken from the current status segment is entered.

When, therefore, a location number in a local descriptor table LDT is indicated in a segment register, this then always means the current local descriptor table LDT wherein, analogous to the global descriptor table GDT, the appertaining location number references a segment descriptor.

A task switch, also referred to as a process change, is provided with respect to hardware in the microprocessor for a task change, i.e. a previously-ready task should begin running and the previously-running task should become ready or be terminated. Given this task switching, the data belonging to the previously-running task are stored in the status segment belonging to the task on the basis of internal processor control and are replaced by the data belonging to the task that is now ongoing. The task register TR and the local descriptor table register LDTR are set to the current status segment or, respectively, to the current local descriptor table LDT.

For immediate handling of software and hardware events, a further table, what is referred to as an interrupt descriptor table IDT, stored in the main memory area is made available to the microprocessor. References to all interrupt routines (also referred to as interrupt handlers) that come into consideration given the appearance of an event (also referred to as interrupt, stimulus or interrupt requests) are deposited in the interrupt descriptor table IDT in the form of a respective location number in the global descriptor table GDT or, respectively, a local descriptor table LDT and a relative address. A code segment descriptor represents the address for a code segment containing a respective interrupt routine is situated under the appertaining location number in the global descriptor GDT or, respectively, ALDT. The appertaining relative address is the starting address of the interrupt routine within this code segment.

Upon the appearance of an event, the identification number that identifies the appertaining event is used as a location number in the interrupt descriptor table IDT in order to select the interrupt routine belonging to the event via the global descriptor table GDT or, respectively, ALDT.

For defining the interrupt descriptor table IDT in the addressing range of the microprocessor, the absolute starting address and the length of the interrupt descriptor table IDT are set in an internal register of the microprocessor, in what is referred to as the interrupt descriptor table register IDTR.

With the assistance of such addressing mechanism controlled via tables, the idle task in a program subsystem of the real-time operating system are fashioned as a branch subsystem SUB1 or, respectively, as a further branch subsystem SUB2 in order to be able to make the system processor available to the subscriber operating system and to the real-time operating system.

A prerequisite therefor is that the critical parts of both operating systems, i.e. the operating system programs together with appertaining data, are deposited in the system memory of the system processor. Since both operating systems comprise program structures that are independent of one another and are fundamentally autonomous, each of the operating systems has its own addressing tables in the form of respectively only one global descriptor table GDT and interrupt descriptor table IDT, as well as a plurality (potentially) of status segments and local descriptor tables LTD.

For the purpose of a better discrimination, the global descriptor table GDT assigned to the real-time operating system is also referred to as a system table memory and the interrupt descriptor table IDT is referred to as a further system table memory; the global descriptor table GDT assigned to the subscriber operating system is referred to as a module table memory and the interrupt descriptor table is referred to as a further module table memory.

So as not to unnecessarily complicate understanding of the program-oriented measures leading to the present invention, the following shall proceed on the basis of a simplified concept wherein the number of status segments of both operating systems is limited to only one status segment TSS, for which reason both operating systems can be respectively treated as one task as seen from the viewpoint of the microprocessor. A task switching within the individual operating systems is therefore undertaken without the task-associated assistance of the 80386 microprocess hardware.

In addition to plurality of descriptors individually associated to the operating systems, common descriptors, what are referred to as communication descriptors, are present in the system table memory (GDT of the real-time operating system) as well as in the module table memory (GDT of the subscriber operating system), each of these communication descriptors being respectively represented in both GDTs in identical form. These common descriptors are deposited in the GDTs under identical location numbers. A data segment descriptor, a status segment descriptor and at least one code segment descriptor are initially of interest as common descriptors.

The two common data segment descriptors define only one data segment that shall be referred to below as an intercommunication data segment because it can be reached by both operating systems and can be used for data transfer.

The two common code segment descriptors define a code segment in which program sequences are stored, these program sequences being handled given a transition from one operating system to the other. This code segment is essentially used by the two branch subsystems of the real-time operating system since the transition into the subscriber operating system occurs given a running idle task (branch subsystem SUB1) or, respectively, a running, further branch subsystem SUB2.

The two common status segment descriptors define the status segment belonging to the real-time operating system. The location number of the common status segment descriptors is deposited in the intercommunication data segment proceeding from the real-time operating system, together with the starting addresses and lengths of both the global descriptor tables GDTs and interrupt descriptor tables IDTs. Moreover, the location number in the module table memory at which the status segment descriptor of the subscriber operating system is located is entered in the intercommunication data segment.

Since the central processor, also referred to below as a central data processor, must be available to the real-time operating system for an initialization of the overall communication system, it is assumed that all microprocessor-internal registers are set according to the requirements of the real-time operating system before a first transition into the subscriber operating system.

Figure 2:
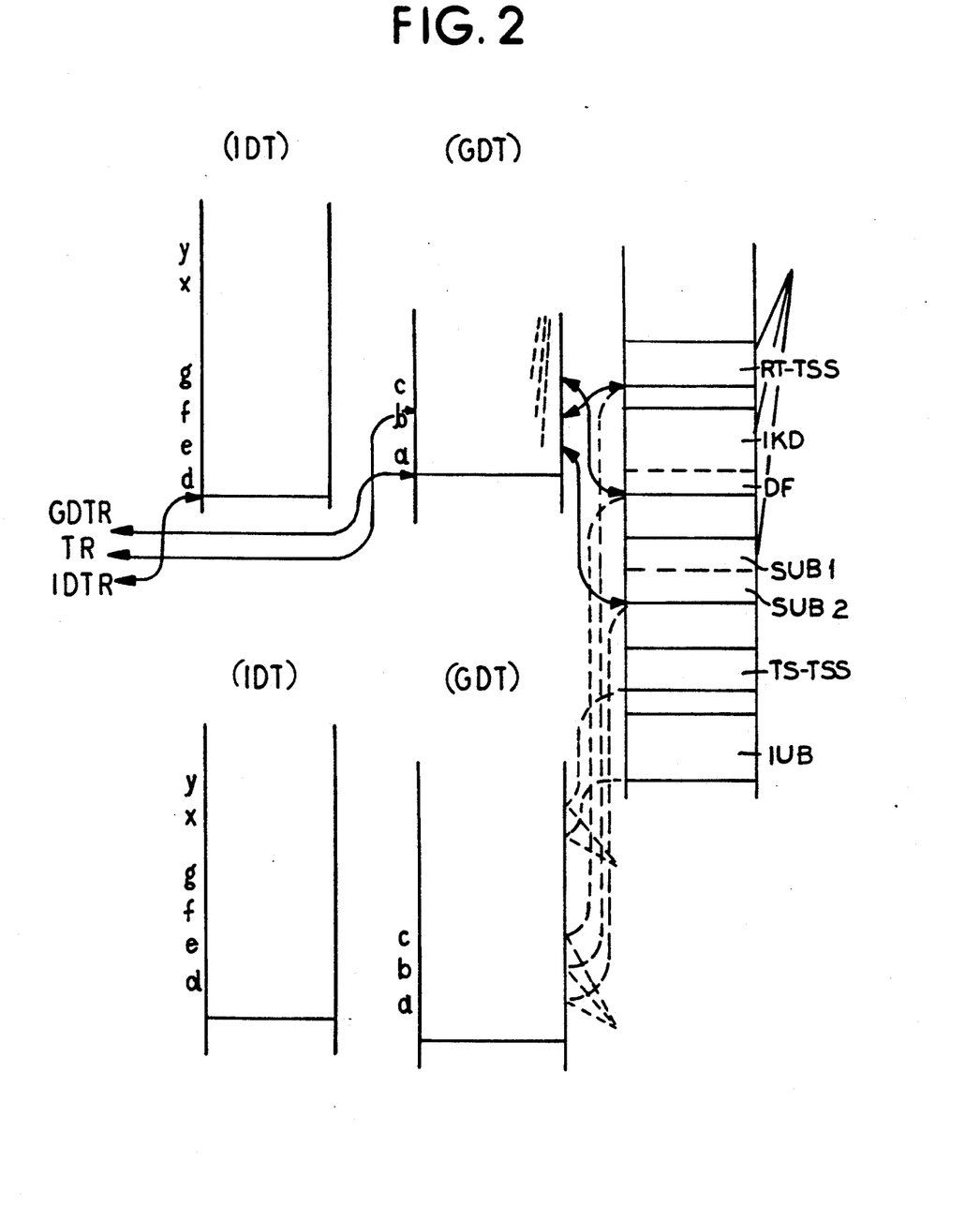
FIG. 2 is a schematic illustration of the relevant descriptiors in the table memories and of the relevant segments in the system memory, as well as having the references relevant at the time II according to FIG. 1.
Figure 3:
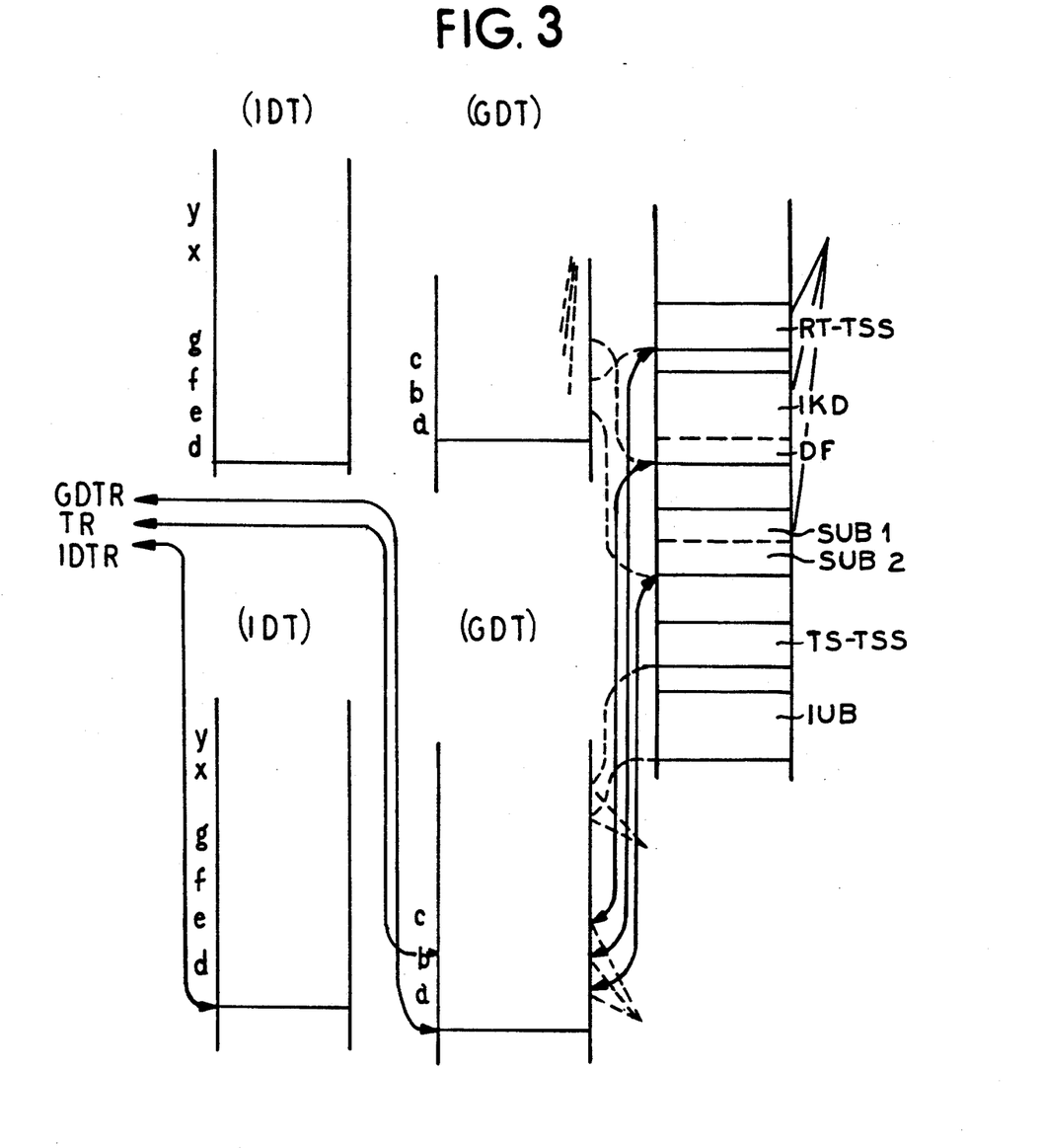
FIG. 3 is an illustration similar to that of FIG. 2 having the references relevant at the time III—III of FIG. 1.
Figure 4:
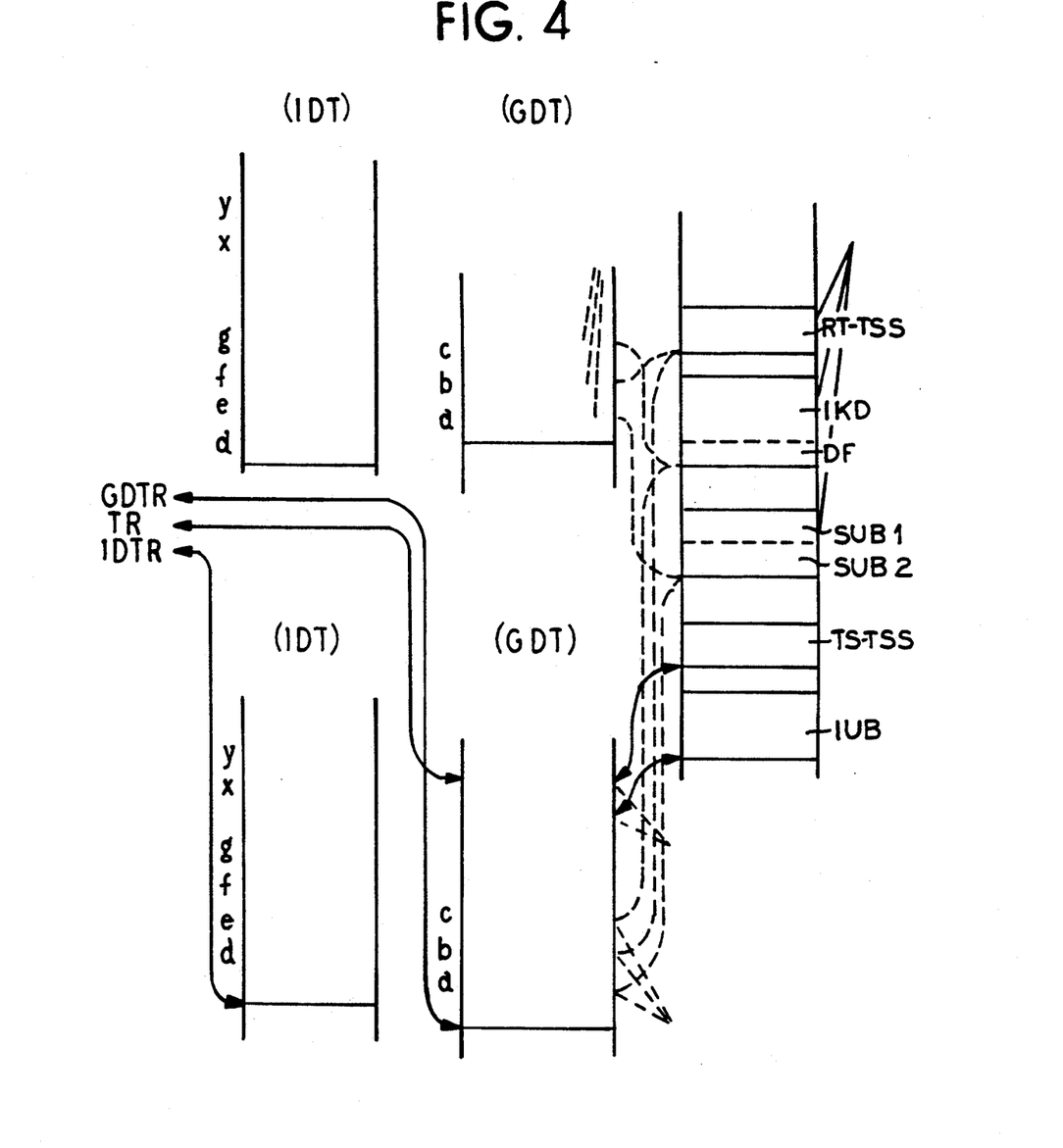
FIG. 4 is, again, an illustration similar to that of FIG. 2, having the references relevant at the time IV of FIG. 1.

FIGS. 2-4 each respectively schematically illustrate the descriptors in the system or, respectively, module table memories, together with the assigned memory segments in the system memory. The reference arrows entered in FIGS. 2-4 represent the descriptor references respectively valid given the steps II-IV marked in FIG. 1. The further or second branch subsystem SUB2 is assigned by the task scheduler TSK of the real-time operating system to the central processor for handling when the second branch subsystem SUB2 is ready to run on the basis of a first, periodic event that has arrived and no program subsystem having higher priority when compared to the second branch subsystem is ready to run. As soon as the second branch subsystem SUB2 is assigned to the central processor for handling, i.e. has assumed a running condition (the descriptor references illustrated in FIG. 2 hold true), program-oriented control instructions in the second branch subsystem SUB2 result therein such that the internal interrupt descriptor table register IDTR and the global descriptor table register GDTR of the system processor are overwritten with the starting addresses of the module table memory and of the further module table memory (GDT and IDT of the subscriber operating system) deposited in the intercommunication data segment IKD. The descriptor references shown in FIG. 3 are then valid.

Since the common descriptors for the code segment of the branch subsystem SUB1 or, respectively, of the second branch subsystem SUB2, for the intercommunication data segment IKD and for the status segment RT-TSS of the real-time operating system are present in the module table memory, the central processor still always obtains its instructions from the code segment of the second branch subsystem SUB2.

In addition to the code segment for the second branch subsystem SUB2, FIGS. 2-4 also illustrate the code segment for the idle task, fashioned as a branch subsystem SUB1. This code segment is relevant when the transition between the two operating systems occurs via the idle task fashioned as the branch subsystem SUB1.

During the further course of events, the program of the second branch subsystem SUB2 initiates a task switching (process change) onto the status segment descriptor TS of the subscriber operating system whose location number (in the module table memory) is deposited in the intercommunication data segment IKD. In this task switching, which is triggered with a microprocessor branch instruction, the microprocessor register contents, for example segment register, instruction counter, but not the interrupt descriptor table register IDTR and the global descriptor table register GDTR belonging to the currently-running task of the real-time operating system are automatically entered into the status segment RT-TSS of the real-time operating system by the microprocessor and are replaced by the corresponding values from the status segment TS-TSS belonging to the subscriber operating system. The location number of the status segment descriptor TS belonging to the subscriber operating system is entered in the task register TR. The descriptor references shown in FIG. 4 are then valid.

After this task switching or program change, the central processor obtains its instructions from a code segment belonging to the subscriber operating system since the segment registers of the task switching were also reloaded.

This code segment is to be fundamentally assigned to the task scheduler TSKT of the subscriber operating system and essentially contains the interrupt transition routine IUB that is provided for the program-oriented linking to the branch subsystems SUB1, SUB2 on the part of the subscriber operating system. The interrupt transition routine IUB shall be set forth below in greater detail.

Internal task changes are implemented in both operating systems given the occurrence of events that are communicated to the task schedulers TSK, TSKT in the form of hardware or, respectively, software interrupts. For handling different interrupt sources, the task schedulers TSK, TSKT comprise what are referred to as interrupt routines that are selected with reference to the identification numbers x, y, d, e, f, g, that are co-provided given the occurrence of an interrupt and identify the pertaining interrupt. Even though both operating systems must react to hardware or, respectively, software events, it is of critical significance for the real-time operating system differing from the subscriber operating system, to be able to react immediately given the occurrence of an important event. On the other hand, a multitude of events that, in fact, require processing and that, however, involves one that is not so urgent that it leads to trouble in the system when handling thereof is somewhat delayed occur in the real-time operating system of the communication system.

Such a delay in the handling of events that are relatively uncritical in terms of time is accepted in order to allow a certain minimum capacity of the calculating capacity of the central processor to be accorded to the subscriber operating system in accordance with the object of the present invention. A priority value PR is therefore assigned in the real-time operating system to the program subsystem which is fashioned as a further branch subsystem SUB2 for a transition between the operating systems, this priority value PR assuring that the program subsystems PSS provided for handling time-critical events have priority and that the second branch subsystem SUB2 has a higher priority that the other program subsystems PSS that is provided for handling events that are not critical in terms of time.

As a consequence of this assigning of priority values, a decision must be made given the appearance of an interrupt pertaining to the real-time operating system in a condition in which the central data processor is assigned to the subscriber operating system as to whether this interrupt that has occurred signals a time-critical event (higher priority than the second branch subsystem SUB2) or a non-critical time event (lower priority than the second branch subsystem SUB2). In the former case, the interrupt transition routine IUB of the subscriber operating system is selected given the occurrence of an interrupt, this immediately initiating a transition of the central data processor back to the second branch subsystem SUB2 of the real-time operating system. In the latter instance, the handling of an interrupt rescue routine TS-IRR of the subscriber operating system is initiated, this merely depositing the identification number of the interrupt pertaining to the real-time operating system in the intercommunication data segment IKD.

A second periodic event following the first periodic event is also included among the high-priority events directed to the real-time operating system. Compared to the first periodic event that serves the purpose of placing the second branch subsystem SUB2 into a ready condition, the second periodic event serves the purpose of initiating the transition from the subscriber operating system back into the real-time operating system.

Therefore, as soon as an event pertaining to the real-time operating system and having a higher priority in comparison to the second branch subsystem SUB2 appears, the interrupt transition routine IUB initiates a process change to the status segment descriptor of the real-time operating system after storing the identification number that identifies the appertaining interrupt in the intercommunication data segment IKD. The location number of this status segment descriptor (in the global descriptor tables GDTs) is deposited in the intercommunication data segment IKD. The descriptor references shown in FIG. 3 are again valid.

After this process change, that is likewise triggered by a branch instruction of the microprocessor, the central data processor again obtains its instructions from the code segment of the second branch subsystem SUB2, namely from the location that follows the process change to the subscriber operating system.

At this point, a control message is responsible therefor that the register contents of the global descriptor table register GDTR and the interrupt descriptor table register IDTR are again set to the values belonging to the real-time operating system that are deposited in the intercommunication data segment IKD. The descriptor references illustrated in FIG. 2 are again valid.

Subsequently, the identification number or, respectively, identification numbers of the interrupt or interrupts pertaining to the real-time operating system that is or are deposited in the intercommunicated data segment IKD immediately before by the interrupt transition routine IUB or the identification number or, respectively, identification numbers deposited in the intercommunication data segment IKD by the interrupt rescue routine TS-IRR of the subscriber operating system is/are read out and, after a potential recording, is/are communicated to the task scheduler TSK of the real-time operating system in conjunction with potential software interrupts.

The second branch subsystem SUB2 subsequently ends in that it switches into a dormant condition for a certain time interval. The handling of the second branch subsystem SUB2 is therefore over for the task scheduler TSK. The second branch subsystem SUB2 is again ready to run only given the occurrence of the next periodic event.

Given an active real-time operating system, of course, interrupts (events) can also appear that relate to the subscriber operating system. These interrupts, however, cannot be immediately processed then; their occurrence, however, must be registered for an interpretation to be carried out by the subscriber operating system.

In order to be able to immediately identify the affiliation of an interrupt to an operating system upon the appearance of an interrupt, the identifier number x, y for the subscriber operating system and d, e, f, g for the real-time operating system that accompanied the interrupts of one operating system are different from those of the interrupts of the respective other operating system.

Since the identification numbers of the interrupts are employed as location numbers in an interrupt descriptor table IDT in order to identify the branch destination of an interrupt routine assigned to a respective interrupt and each of the operating systems has its own interrupt descriptor table IDT, location numbers both for internal interrupts of the operating system and location numbers for interrupts foreign to the operating system are provided in the interrupt descriptor tables IDTs of both operating systems.

Figure 5:
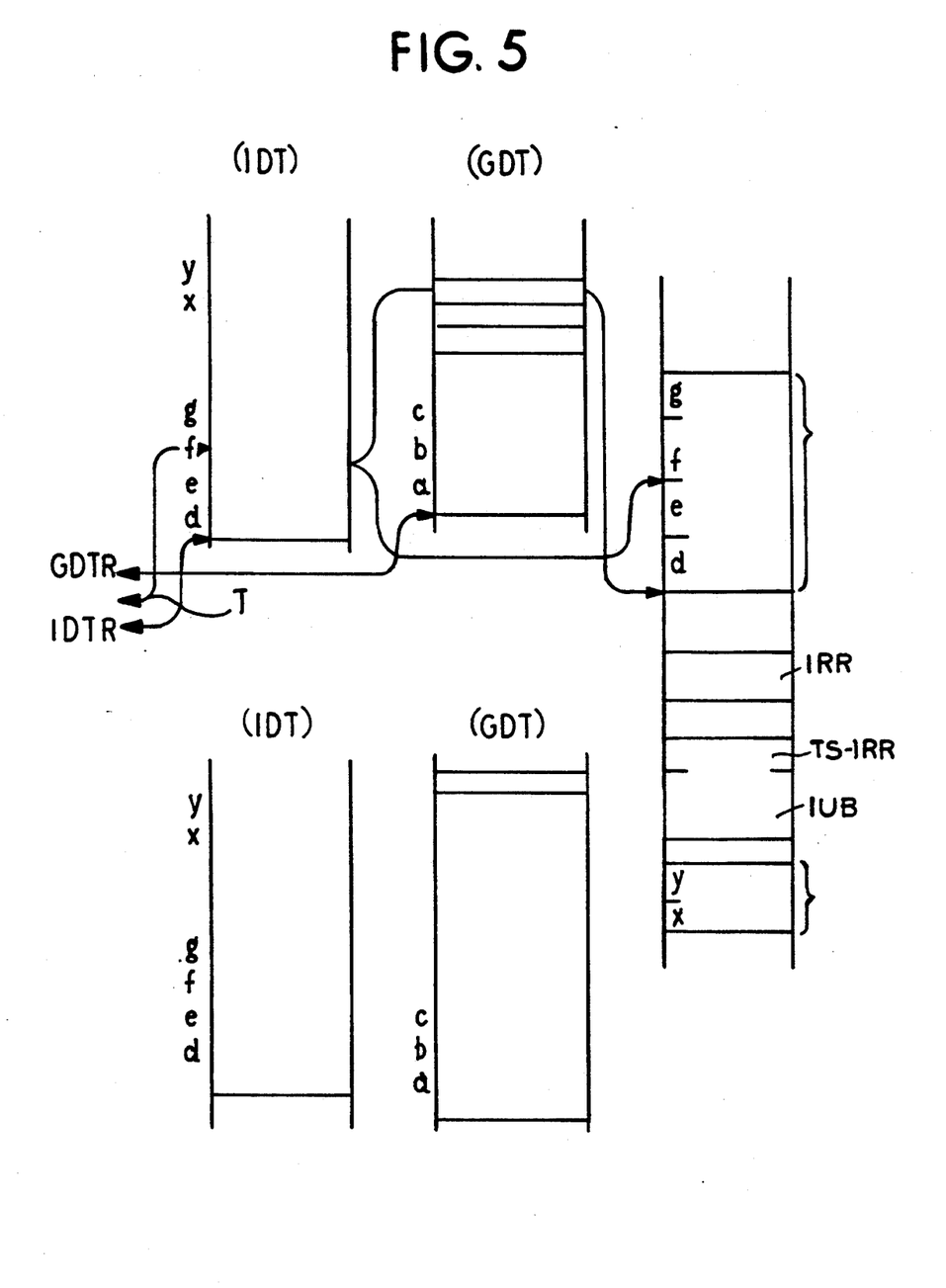
FIG. 5 is another schematic illustration similar to that of FIG. 2 with the descriptors relevant for an interrupt handling as well as of the references that are relevant given an active real-time operating system and an interrupt request belonging to this operating system.
Figure 6:
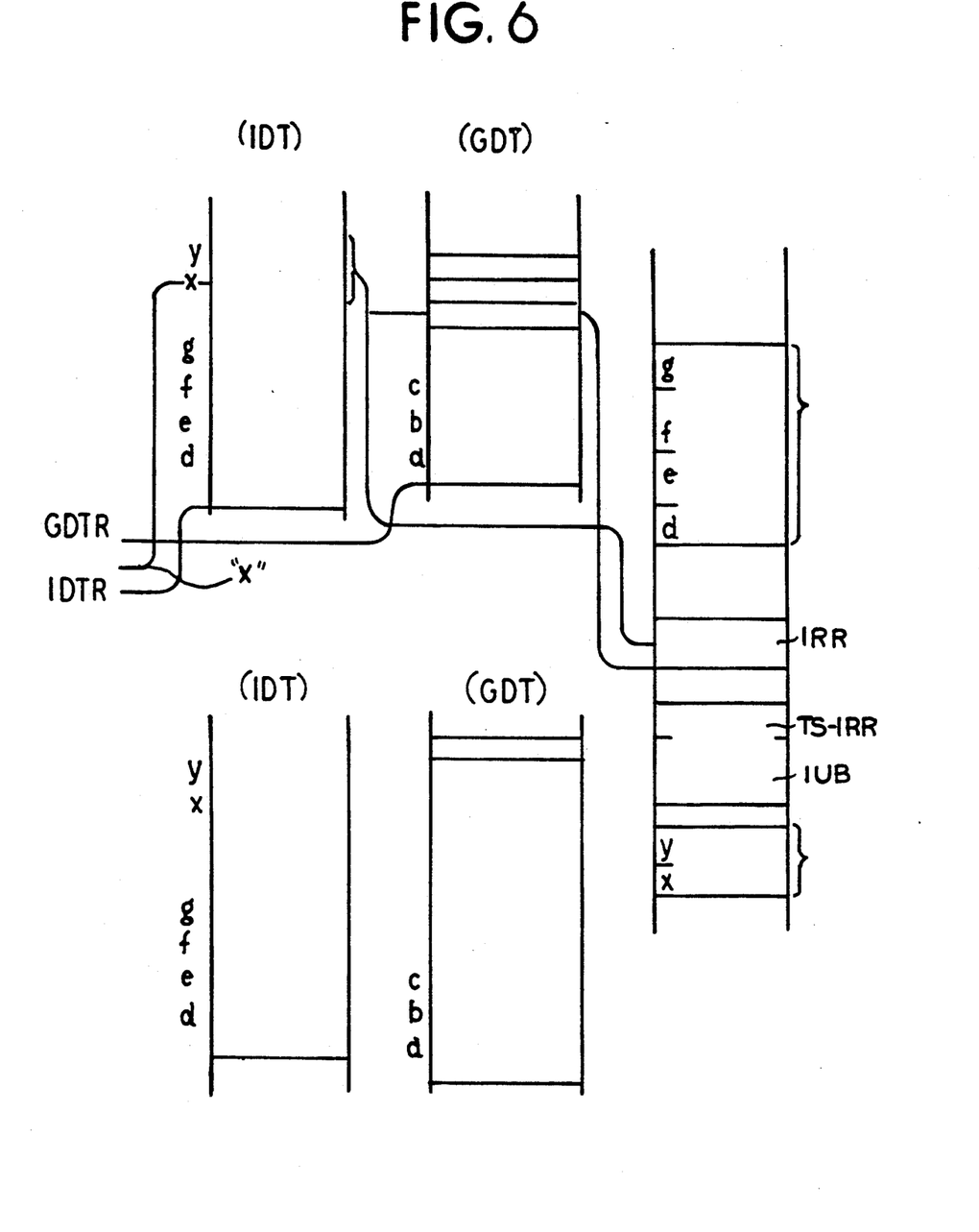
FIG. 6 is a similar schematic illustration having the references relevant given an active real-time operating system and an interrupt request belonging to the subscriber operating system.
Figure 7:
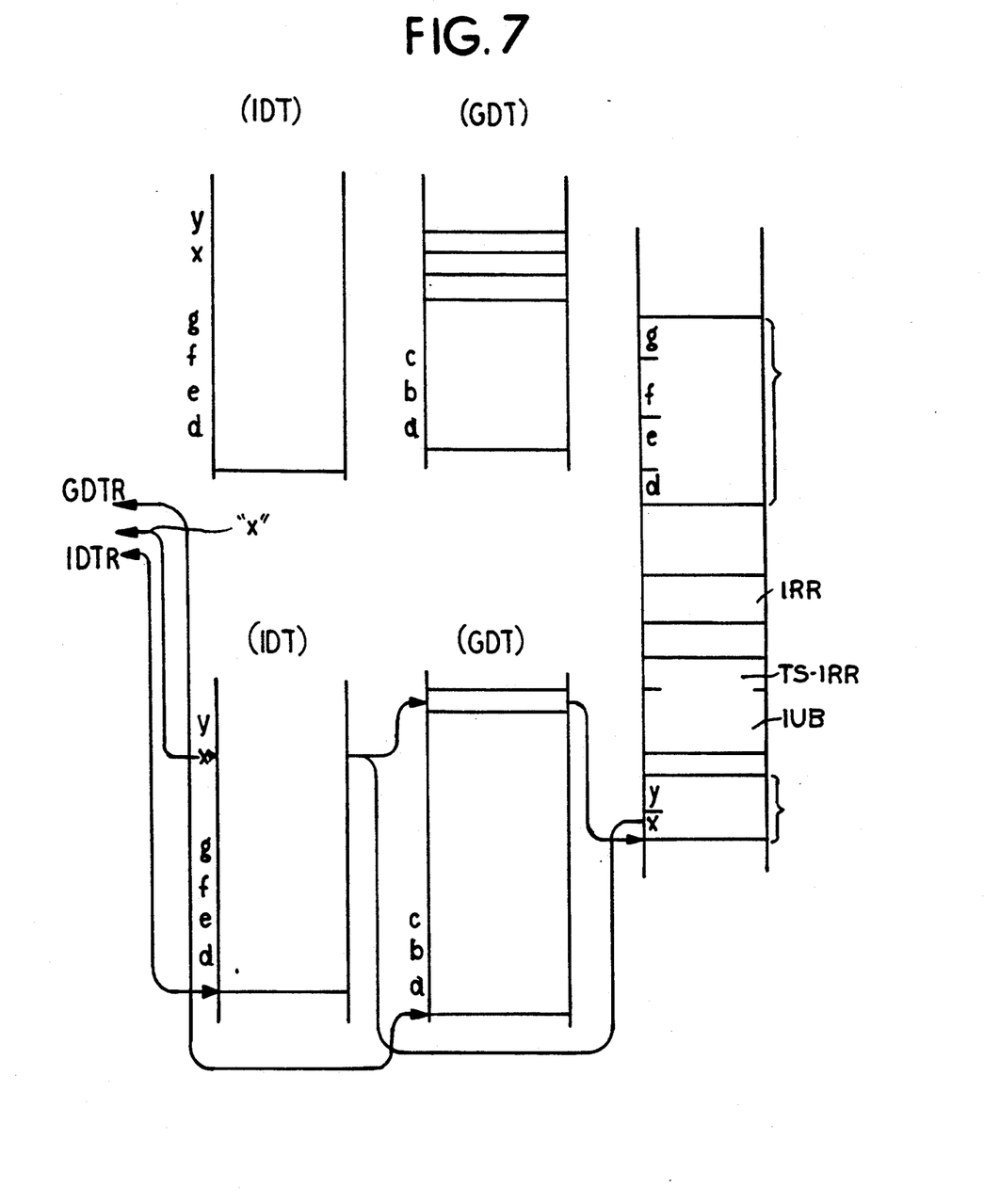
FIG. 7 is an illustration similar to that of FIG. 5 having the references relevant given an active subscriber operating system and an interrupt request belonging to this operating system.
Figure 8:
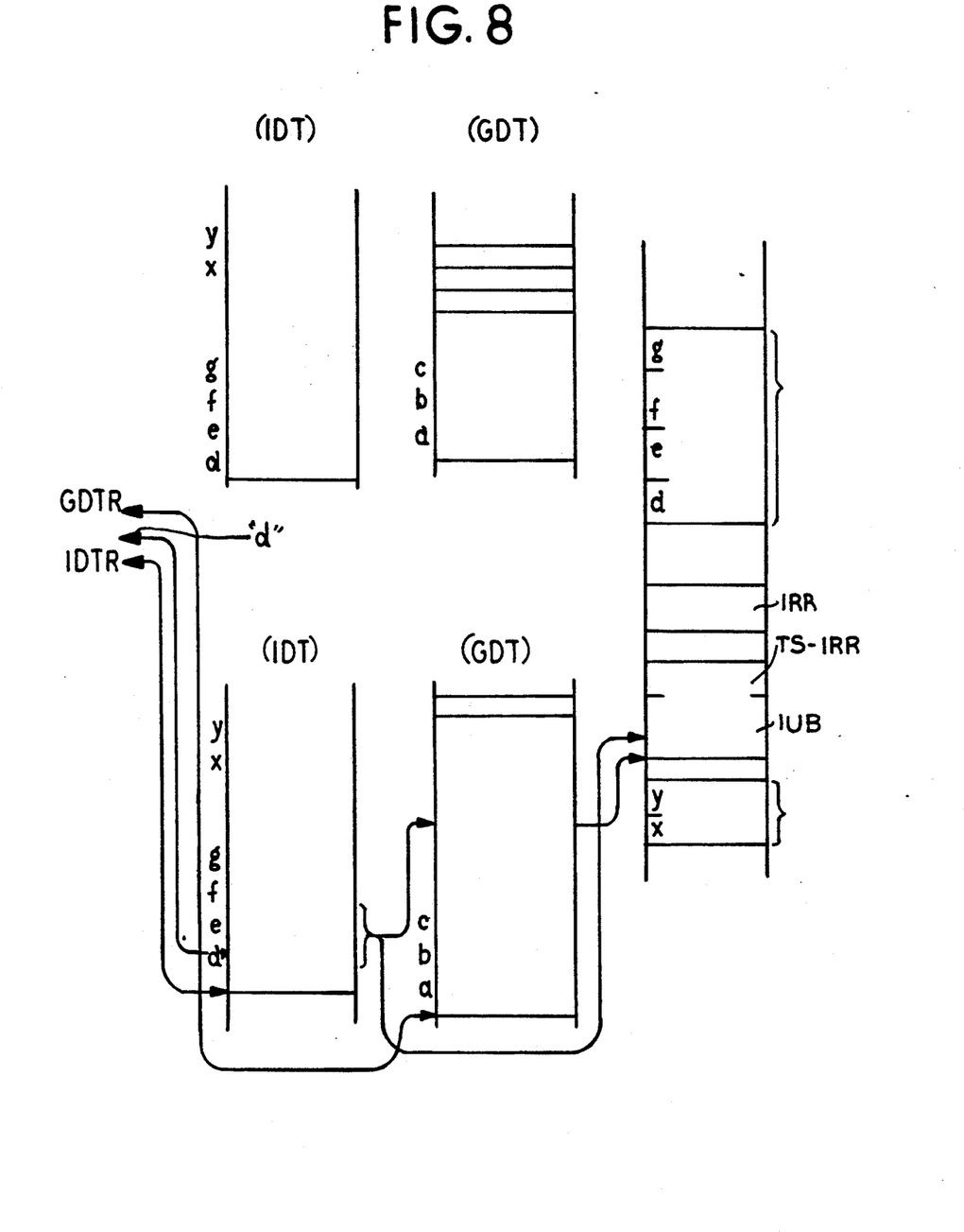
FIG. 8 is an illustration similar to that of FIG. 5 having the references relevant given an active subscriber operating system and an interrupt request (high priority) belonging to the real-time operating system.
Figure 9:
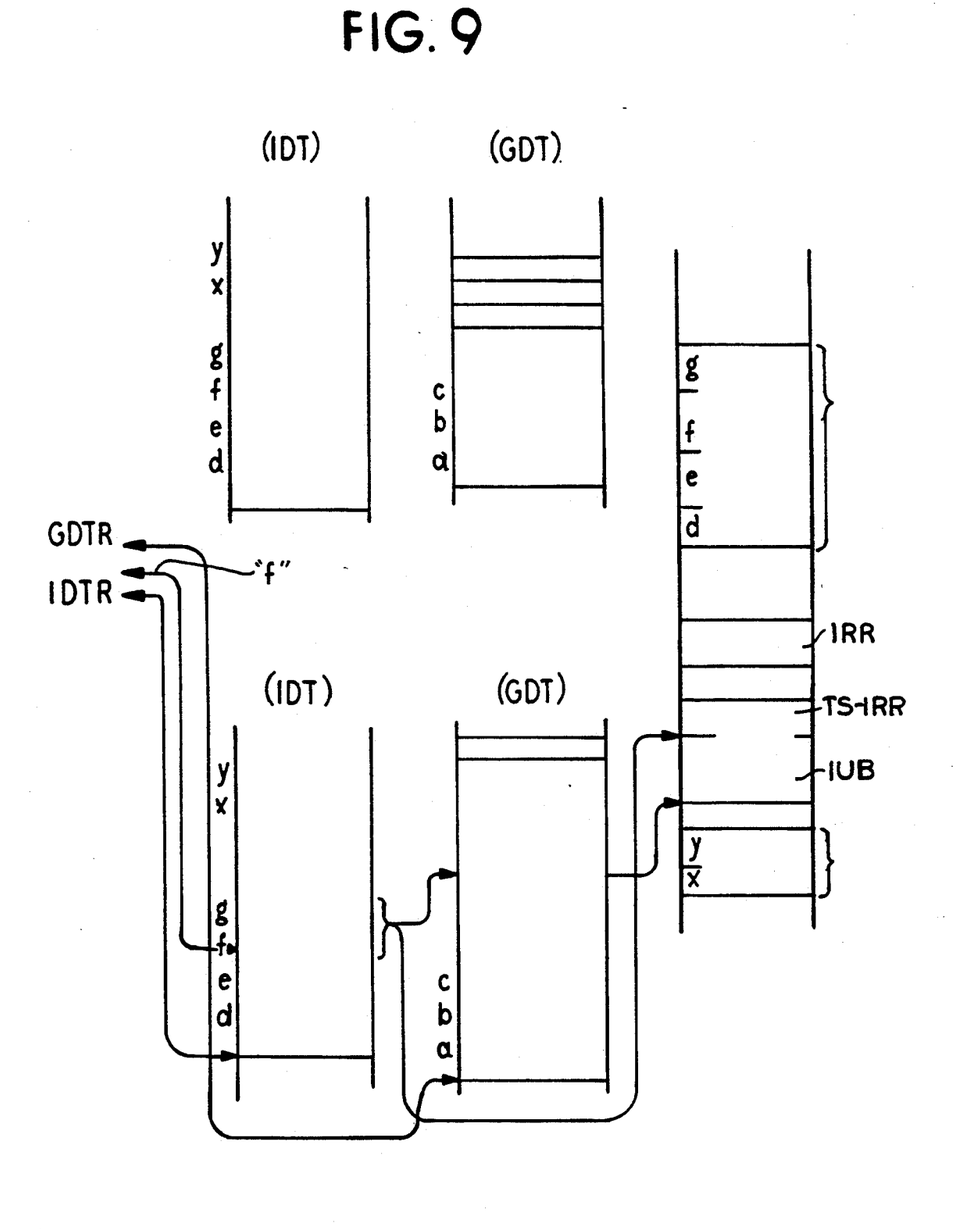
FIG. 9 is an illustration similar to that of FIG. 5 having the references relevant given an active subscriber operating system and interrupt request (low priority) belonging to the real-time operating system.

FIGS. 5-9 schematically illustrative representative excepts of the system or, respectively, module table memories with the descriptors therein relevant for an interrupt handling as well as their references to the various interrupt routines. When the real-time operating system is accurate, the descriptor references shown in FIG. 5 are valid for system-inherent interrupts, i.e. for interrupts directed to the real-time operating system, and the descriptor references shown in FIG. 6 are valid for the interrupt directed to the subscriber operating system. When the subscriber operating system is active, the descriptor references shown in FIG. 7 are valid for system-inherent interrupts, i.e. for interrupts referred to the subscriber operating system, and the descriptor references shown in FIG. 8 and FIG. 9 are valid for external system interrupts, i.e. interrupts referred to the real-time operating system.

References to the interrupt routines individually-associated to the operating systems are deposited in the two interrupt descriptor tables IDTs under the location numbers of the internal interrupts of the operating system. References to the pertaining interrupt routines are deposited in the interrupt descriptor table IDT of the real-time operating system under the location numbers of the internal interrupts d, e, f, g, of the operating system. One of these internal interrupts of the operating system is identical to the first periodical event PA1 that is intended to initiate a handling of the second branch subsystem SUB2. However, references to a common interrupt rescue routine IRR are deposited in the interrupt descriptor table IDT of the real-time operating system (further system table memory) under the location numbers of the interrupts which are external to the operating system, this interrupt rescue routine IRR, when the real-time operating system is active, only entering the identification numbers x, y assigned to this interrupt into the intercommunication data segment IKD in response to an interrupt x, y pertaining to the subscriber operating system. The descriptor references illustrated in FIG. 6 are now valid.

References that refer to the interrupt transition routine IUB or to the interrupt rescue routine in the subscriber operating system TS-IRR are deposited in the interrupt descriptor table IDT of the subscriber operating system (further module table memory) under the location number d, e, f, g that are external to the operating system. In the present exemplary embodiment, the location number d, e are provided for interrupts that have a higher priority in the real-time operating system in comparison to the second branch subsystem SUB2 and their appearance when the subscriber operating system is active must therefore lead immediately to the transition into the real-time operating system. In this respect, see the descriptor references illustrated in FIG. 8. One of these interrupts, having the location numbers d, e, is triggered by the second periodic event PA2 that initiates a return into the real-time operating system.

The aforementioned interrupt transition routine IUB effects that transition into the second branch subsystem SUB2 or, respectively, a branch subsystem SUB with a first program sequence, dependent upon by way of which the two branch subsystems, the transition from the real-time operating system into the subscriber operating system was triggered.

In a second program sequence of the interrupt transition routine IUB, the program change is handled by the central data processor immediately after a task switching to the status segment descriptor TS of the subscriber operating system. This second program sequence is also called event identification since it is responsible for an interpretation of the identification numbers of the interrupt x, y pertaining to the subscriber operating system that is entered in the intercommunication data segment IKD by the interrupt rescue routine IRR of the real-time operating system.

References to the interrupt rescue routine of the subscriber operating system TS-IRR are deposited under the location numbers f and g of the location number d, e, f, g external to the operating system in the interrupt descriptor table IDT of the subscriber operating system (further module table memory). The descriptor references shown in FIG. 9 are then valid.

The location numbers f and g are provided for events that are directed to program subsystems whose priority is lower compared to that of the second branch subsystem SUB2; when the subscriber operating system is active, these program subsystems therefore need not absolutely be handled immediately. Given the appearance of an event f, the interrupt rescue routine is handled in the subscriber operating system TS-IRR, this merely depositing the identification number of the pertaining event in the intercommunication data segment IKD.

Figure 10:
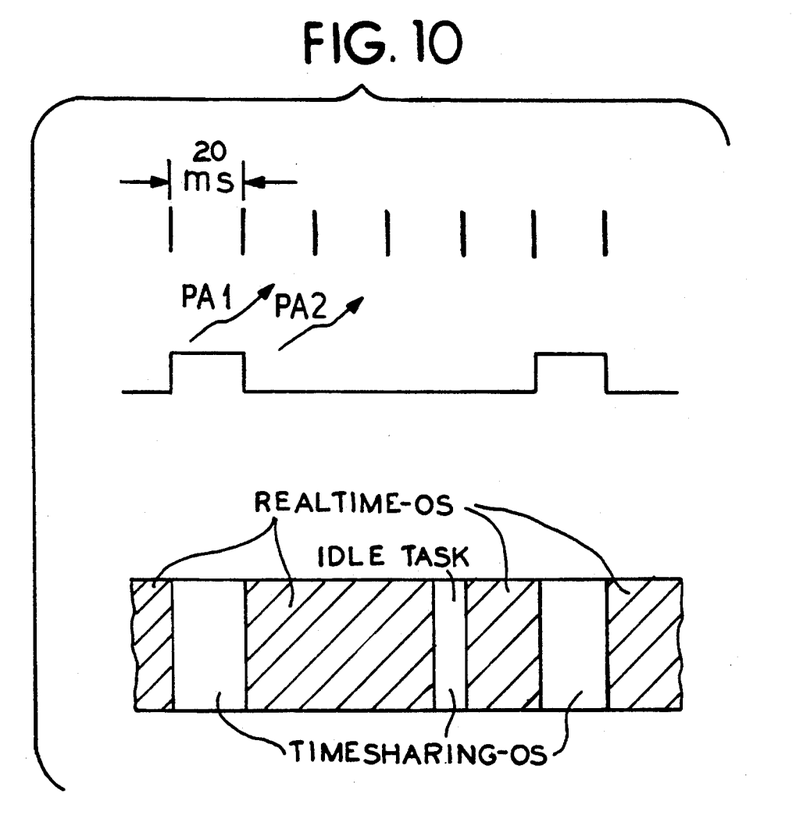
FIG. 10 is a timing diagram for illustrating the chronological distribution of the computing capacity.

With reference to a timing diagram, FIG. 10 illustrates a possible distribution of the calculating capacity of the central unit to the two operating systems within a time interval of the first periodic event. The first and second periodic events are generated from a time-synchronous signal pulse whose pulse duty factor is 1:4. For example, the period interval can amount to 100 ms. The first periodic event PA1 is generated by the leading edge and the second periodic event is generated by the trailing edge of the pulse I. When the calculating capacity that occurs as a consequence of a transition, with the assistance of the idle task fashioned as a branch subsystem is omitted from consideration, then 20% of the calculating capacity of the processing unit is assigned to the subscriber operating system in the present example, insofar as potential exceptions are not taken into consideration. This percentage is increased when the idle task is also being additionally handled in the real-time operating system. The portion of the calculating capacity devolving onto the subscriber operating system can be arbitrarily varied by varying the pulse duty factor.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A modularly-structured integrated services digital network communication system comprising at least one switching unit including a switching network to which apparatus and networks can be connected via peripheral modules, and of the type comprising a memory-programmed system processor, that comprises a real-time operating system for controlling subsystems provided for execution of communication technology-associated functions and for control of an idle task subsystem that is fashioned as a branch subsystem for a transition to a time sharing operating system, a system memory that comprises memory segments addressable via descriptors, a system table memory that contains system table descriptors referring to memory segments of the real-time operating system, a further system table memory that contains real-time interrupt descriptors for events pertaining to the real-time operating system, a module table memory that can be selected alternatively to the system table memory and that contains module table descriptors referring to memory segments of the time sharing operating system, and further contains communication descriptors referring to intercommunication segments of the real-time operating system that can be interpreted identically with the system table descriptors contained in the system table memory and referring to the intercommunication segments and among which, at least one code segment descriptor for access onto the code segment of the branch subsystem, and one status segment descriptor for access onto a status segment assigned to the branch subsystem in the real-time operating system, and one data segment descriptor for access onto an intercommunication data segment storing input information required by each of the two operating systems, when a transition to the other respective operating system is given, a further module table that can be selected alternatively to the further system table memory and that contains interrupt descriptors for events pertaining to the time sharing operating system, control elements in the branch subsystem that, when activation of the branch subsystem is given, trigger an allocation change of the system processor from the system table memories to the module table memories and, calling of a status segment descriptor, subsequently effects a process change into the interrupt transition routine that is subsequently ended, and control statements in the interrupt transition routine that, when activation of the interrupt transition routine is given, initiate a process change into the branch subsystem upon calling the communication status segment descriptor, and further control statements in the branch subsystem that effect an allocation change of the system processor from the module table memories to the system table memories, the improvement wherein:

a subsystem having comparatively high priority is constructed in the real-time operating system as a further branch subsystem;

said further branch subsystem when an arrival of a first periodic event is given, assumes a ready status in order to be assigned to the system processor in the real-time operating system for execution;

said further module table memory contains a further interrupt descriptor for at least a second periodic event following said first periodic event, said further interrupt descriptor contains address information for execution of the interrupt transition routine;

said further module table memory contains interrupt descriptors for events pertaining to the real-time operating system, said interrupt descriptors each containing address information for execution of an interrupt rescue routine in the time sharing operating system; and following the allocation change of the system processor from the module table memories to the system table memories, said further branch subsystem assumes a dormant condition which is provided as a non-ready task status in the real-time operating system.

2. The modularly-constructed communication system of claim 1, wherein: events pertaining to the real-time operating system are shared in the intercommunication data segment by said interrupt rescue routine of said time sharing operating system.

3. The modularly-constructed communication system of claim 2, wherein: in the further branch subsystem said events stored in the intercommunication data segment by the interrupt rescue routine of the time sharing operating system are identified.

4. The modularly-constructed communication system of claim 3, wherein: said interrupt transition routine is available to both of said branch subsystems.

5. The modularly-constructed communication system of claim 4, wherein: means are provided for providing said first periodic event with a repetition having a period interval that is a multiple of the chronological spacing between said first and second periodic events.

6. The modularly-constructed communication system of claim 5, wherein: means are provided for generating said first and second periodic events for respective separate signal edges of a periodic signal pulse.

* * * * *